(12) United States Patent
Jin et al.

(10) Patent No.: US 8,696,920 B2
(45) Date of Patent: Apr. 15, 2014

(54) METHOD OF FABRICATING CASE FOR PORTABLE ELECTRONIC DEVICE

(75) Inventors: Jae-Chul Jin, Gyeonggi-do (KR);
Yong-Wook Hwang, Gyeonggi-do (KR);
Seung-Chang Baek, Seoul (KR);
Jong-Woo Kim, Gyeonggi-do (KR);
Hoon-Soo Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 291 days.

(21) Appl. No.: 13/066,687

(22) Filed: Apr. 21, 2011

(65) Prior Publication Data
US 2011/0259780 A1  Oct. 27, 2011

(30) Foreign Application Priority Data
Apr. 27, 2010 (KR) .......................... 10-2010-0038879

(51) Int. Cl.
*B44C 1/22* (2006.01)
*B23K 15/00* (2006.01)
*B23K 26/00* (2014.01)
*H01M 2/10* (2006.01)

(52) U.S. Cl.
CPC ......... *B23K 26/0084* (2013.01); *B23K 2203/10* (2013.01); *B44C 1/228* (2013.01); *H01M 2/1022* (2013.01)
USPC .................. 216/65; 216/58; 216/83; 216/102; 219/121.19; 148/97

(58) Field of Classification Search
USPC ................... 219/121.19; 216/65, 58, 83, 102; 148/97
See application file for complete search history.

(56) References Cited

U.S. PATENT DOCUMENTS

| 4,436,594 | A  | * | 3/1984 | Nishida et al. ................. 205/211 |
| 7,921,997 | B2 | * | 4/2011 | Burns ............................ 206/320 |
| 2008/0057336 | A1 | * | 3/2008 | Kurokawa et al. ............ 428/639 |
| 2009/0118404 | A1 | * | 5/2009 | Hakuta et al. ................. 524/266 |
| 2011/0159324 | A1 | * | 6/2011 | Huang et al. ....................... 429/7 |
| 2012/0063115 | A1 | * | 3/2012 | Prest et al. .................... 361/810 |

FOREIGN PATENT DOCUMENTS

| JP | 2008-012567 | * | 1/2008 | |
| KR | 20-0330639 | | 10/2003 | ................ B44B 3/00 |
| KR | 20-0390092 | | 7/2005 | ............. H01H 13/70 |
| KR | 10-0819281 | | 4/2008 | ............... H04B 1/38 |

* cited by examiner

*Primary Examiner* — Shamim Ahmed
(74) *Attorney, Agent, or Firm* — Cha & Reiter, LLC

(57) ABSTRACT

A method of fabricating a case for a portable electronic device includes: preparing a case preform; processing the inner surface of the case preform using a laser; and surface-treating the outer surface of the case preform, wherein the outer surface of the case preform shows fine prominences and depressions formed by the surface-treating of the outer surface of the case preform, and patterns formed by processing the inner surface of the case preform appear bumpily on the outer surface of the case preform.

7 Claims, 2 Drawing Sheets
(1 of 2 Drawing Sheet(s) Filed in Color)

METHOD OF FABRICATING CASE FOR PORTABLE ELECTRONIC DEVICE

CLAIM OF PRIORITY

This application claims priority under 35 U.S.C. §119 to a Korean Patent Application entitled "Method Of Fabricating Case For Portable Electronic Device" filed in the Korean Intellectual Property Office on Apr. 27, 2010 and assigned Serial No. 10-2010-0038879, the contents of which are incorporated herein by reference.

BACKGROUND OF THE INVENTION

1. Field of the Invention

The present invention relates to a portable electronic device, and more particularly to a case for a portable electronic device.

2. Description of the Related Art

In general, a portable electronic device comprises a case for enclosing and protecting its internal circuit devices. Since such a case forms and defines the external appearance of the electronic device, it is designed in various shapes so that it can also provide esthetic pleasure. Recently, as it has become popularized for individuals to carry a portable phone, a portable multimedia player, an electronic diary, or the like, these portable electronic devices have evolved into means for expressing users' own individual characters and styles.

The cases for such portable electronic devices are typically fabricated from a synthetic resin or a metallic material. In general, the synthetic resin is molded to a predetermined shape through an injection molding process, whereas the metallic material is formed to a predetermined shape through a die casting process. Molten resin (in the injection molding process) or molten metal (in the die casting process) is poured into a metallic mold so as to mold a case corresponding to a shape previously formed in the metallic mold. The injection molding or die casting may be employed for molding household electronic products, precision machine parts or the like as well as portable electronic devices' cases.

As portable electronic devices are being popularized and has evolved as a kind of fashion item for individuals, users sometimes decorate and change the appearance their portable electronic devices by using a separately bought portable pouch, or various attachment items. As a result of various demands of such users, efforts are being made so as to diversify the cases' external appearances of portable appliances. For example, such efforts include: merely diversifying products' colors; painting a product in such a manner that its color is gradually changed in a single product; and forming patterns on the surface of a product so as to provide a visual effect.

If such a case is fabricated from a synthetic resin, it is possible to implement various patterns and colors by painting or using films or the like. In addition, if such a case is fabricated from a transparent material, it is possible to attach a photograph or the like on the internal surface of the case. However, if such a case is fabricated from a metallic material, visual effects can be provided only through restricted methods, such as painting and etching, and hence many restrictions are accompanied in diversifying the external appearances of portable electronic devices.

SUMMARY OF THE INVENTION

Accordingly, the present invention has been made to solve the above-mentioned problems occurring in the prior art and provides additional advantages, by providing a method of fabricating a metallic case for a portable electronic device that would improve the stereographic effect and visual look and feel, even though the case is fabricated from a metallic material.

Another aspect of the present invention provides a method of fabricating a metallic case having elegant and diversified designs due to various patterns implemented on its external appearance.

In accordance with an aspect of the present invention, a method of fabricating a case for a portable electronic device includes: preparing a case preform; processing the inner surface of the case preform using a laser; and surface-treating the outer surface of the case preform, wherein the outer surface of the case preform shows fine prominences and depressions formed by surface-treating the outer surface of the case preform, and patterns formed by processing the inner surface of the case preform appear bumpily on the outer surface of the case preform.

Another aspect of the present invention provides a portable terminal having a housing that comprises a case preform formed from a metallic material, an inner surface of the case preform is processed using a laser to form patterns, wherein the patterns formed on the inner surface of the case preform appear bumpily on the outer surface of the case preform in an indented form, and the outer surface of the case preform is provided with patterns formed by using fine prominence and depression to form hairlines.

According to the inventive method of fabricating a case for a portable electronic device described above, the patterns formed on the inner surface of the case preform by laser-processing appear bumpily on the outer surface of the case preform, thereby imparting stereographic effects to the external appearance of the case, and also fine prominences and depressions formed on the outer surface of the case preform provide further patterns. As a result, diversified multiple patterns can be implemented, whereby external appearances of portable electronic devices can be diversified.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

The above and other aspects, features and advantages of the present invention will be more apparent from the following detailed description taken in conjunction with the accompanying drawings, in which.

DETAILED DESCRIPTION OF THE INVENTION

Figure 1:
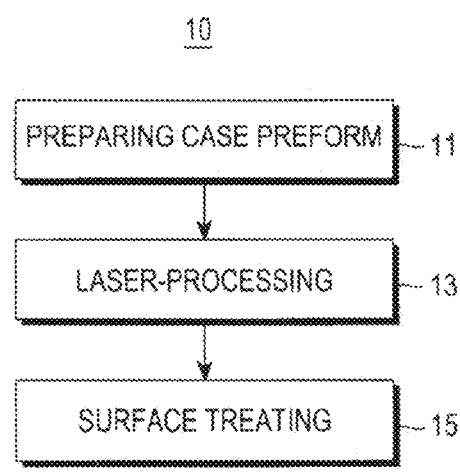
FIG. 1 is a flowchart for describing a method of fabricating a case for a portable electronic device in accordance with an embodiment of the present invention.

Hereinafter, embodiments of the present invention will be described with reference to the accompanying drawings. In the following description, the same elements will be designated by the same reference numerals although they are shown in different drawings. For the purposes of clarity and simplicity, a detailed description of known functions and configurations incorporated herein will be omitted as it may make the subject matter of the present invention rather unclear.

Referring to FIG. 1, a method 10 of fabricating a case for a portable electronic device prepares a case preform, and processes each of the inner and outer surfaces of the fabricated case preform so as to provide multiple patterns on the external appearance of the finally completed case. That is, the patterns formed on the inner surface of the case preform appear bumpily on the outer surface of the case preform in an indented form, and the outer surface of the case preform is provided with patterns formed by using fine prominence and depression, i.e. hair lines.

More specifically, the case fabrication method 10 includes: preparing a case preform (step 11) (hereinafter, this step may be referred to as "preform preparation step"), processing the inner surface of the case preform using a laser (step 13) (hereinafter, this step may be referred to as "laser-processing step"), and surface-treating the outer surface of the case preform (step 15) (hereinafter, this step may be referred to as "surface treatment step").

Cases fabricated by such a case fabrication method may be employed for fabricating a battery cover 201, or a first housing 101, to which the battery cover is detachably attached, wherein the battery cover and the first housing are disclosed in Korean Patent No. 819,281 (U.S. Unexamined Patent Publication No. 2008/0102351A1) owned by the applicant of the present application. Although the Korean Patent (or the U.S. Patent Publication) exemplifies a configuration in which the battery cover is adapted to partially cover the rear side of the first housing, it is possible to fabricate such a battery cover for a portable electronic device to cover the entirety of the battery pack mounting side, and if the battery pack is not a user-changeable type, it would not be necessary to separately fabricate such a battery cover.

The preform fabrication step (step 11) is a step for pouring molten metal into a metallic mold so as to prepare a case preform. Here, although the case preform may be preferably formed from stainless steel, various metals, such as magnesium and aluminum, may be used for preparing the case preform. In addition, the case preform may be prepared using an alloy. Since the molding of such a case preform using a die casting process as described above allows such a case preform to be molded in various shapes according to the metallic mold to be used in the die casting process, such a case preform can be used for fabricating a removable battery cover as well as for fabricating a case for a portable electronic device.

Figure 2:
FIG. 2 shows an inner surface of a case preform processed by a laser-processing process in the inventive case fabrication method shown in FIG. 1.
Figure 3:
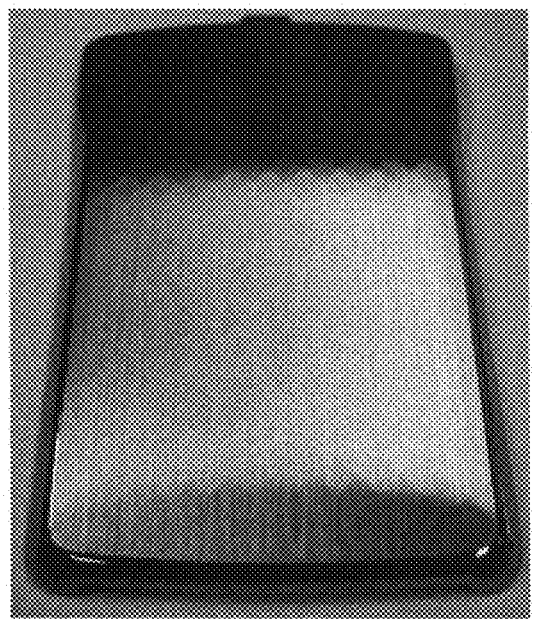
FIG. 3 shows an outer surface of a case preform processed by a surface treating process in the inventive case fabrication method shown in FIG. 1.

The laser-processing step 13 is a step for processing the inner surface of the case preform with a laser, wherein various patterns may be formed on the inner surface of the case preform. FIG. 2 shows the inner surface of a case preform processed through the laser-processing step 13. Here, the patterns formed on the inner surface of the case preform appear bumpily on the outer surface of the case preform, as shown in FIG. 3. Due to the bumpy patterns, the outer surface of the case preform may reflect light in different angles from point to point on the outer surface.

For example, if a plurality of oblique lines are formed on the inner surface of the case preform to be intersected with each other, diamond-shaped patterns are repeatedly formed. In the patterns formed in this manner, each diamond-shaped pattern may be positioned to be inclined in relation to an adjacent diamond-shaped pattern while maintaining its flatness. Therefore, repeated diamond-shaped patterns appear bumpily on the outer surface of the case preform, and hence the diamond-shaped patterns will reflect light in different angles when light is reflected by the outer surface of the case preform. With this method, various visual effects can be implemented on the outer surface of the case even if patterns are not directly formed on the outer surface of the case preform.

In addition, since the laser-processing process can diversify patterns input to a control program even on a processing table, patterns formed on the inner surfaces of case preforms can be differently implemented even if the case preforms were prepared using the same metallic mold. As a result, for portable electronic devices, it is possible to implement external appearances, of which the patterns are different from each other, even if the electronic devices are of the same model.

The surface treatment step 15 is a step for processing the outer surface of the case preform by forming hair lines using a brush, or by etching or plating the outer surface. If hair lines are formed on the outer surface of the case preform, multiple patterns are implemented since the bumpy patterns produced by the patterns formed on the inner surface and the patterns directly formed on the outer surface compositely appear on the outer surface. In addition, if patterns are formed by partially masking the outer surface of the case preform, a stereographic image can be implemented as the patterns formed in this manner are combined with the bumpy patterns produced by laser-processing the inner surface. A case preform processed by the surface treatment step 15 is shown in FIG. 3. From FIG. 3, it can be seen that diamond-shaped patterns appear between dark parts and light parts on the outer surface of the case preform.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method for fabricating a case for a portable electronic device, comprising:
   preparing a case preform corresponding to an outer shape of the portable electronic device and formed from a metallic material;
   processing an inner surface of the case preform using a laser to form patterns on an outer surface of the preform; and
   surface-treating the outer surface of the case preform to form hair lines on the outer surface of the case preform,
   wherein the outer surface of the case preform provides fine prominences and depressions formed by the surface-treating of the outer surface of the case preform, and the patterns formed by processing the inner surface of the case preform provides bumpy patterns on the outer surface of the case preform.

2. The method as claimed in claim 1, wherein the case preform is fabricated from stainless steel.

3. The method as claimed in claim 1, wherein the case preform comprises one of alloy, magnesium and aluminum.

4. The method as claimed in claim 1, wherein the case is used for a battery cover or a housing of the portable electronic device.

5. The method as claimed in claim 1, wherein the outer surface of the case preform reflects light in different angles from point to point on the bumpy outer surface thereof.

6. The method as claimed in claim 1, wherein a plurality of oblique lines are formed on the inner surface of the case preform to be intersected with each other, defining diamond-shaped patterns thereon.

7. The method as claimed in claim 1, wherein the hair lines are formed using a brush or by etching or plating the outer surface of the case preform.

\* \* \* \* \*